United States Patent
Frankel (10) Patent No.: US 7,110,638 B2
(45) Date of Patent: Sep. 19, 2006

(54) RECONFIGURABLE OPTICAL NODE WITH DISTRIBUTED SPECTRAL FILTERING

(75) Inventor: Michael Y. Frankel, Baltimore, MD (US)

(73) Assignee: CIENA Corporation, Linthicum, MD (US)

( * ) Notice: Subject to any disclaimer, the term of this patent is extended or adjusted under 35 U.S.C. 154(b) by 210 days.

(21) Appl. No.: 10/662,352

(22) Filed: Sep. 16, 2003

(65) Prior Publication Data

US 2005/0100271 A1 May 12, 2005

Related U.S. Application Data

(60) Provisional application No. 60/410,996, filed on Sep. 16, 2002.

(51) Int. Cl.
| | |
|---|---|
| G02B 6/28 | (2006.01) |
| G02B 6/12 | (2006.01) |
| G02B 6/26 | (2006.01) |
| G02B 6/42 | (2006.01) |
| H04J 14/00 | (2006.01) |
| H04J 14/02 | (2006.01) |

(52) U.S. Cl. ............... 385/24; 385/14; 385/39; 398/43; 398/45; 398/48; 398/79; 398/82; 398/83; 398/85

(58) Field of Classification Search ............ 385/24, 385/14, 39; 398/43, 45, 48, 79, 82, 83, 85
See application file for complete search history.

(56) References Cited

U.S. PATENT DOCUMENTS

2002/0101636 A1 *  8/2002  Xiao et al. ............ 359/127
2003/0184843 A1 * 10/2003  Moon et al. ........... 359/290

* cited by examiner

*Primary Examiner*—Frank G. Font
*Assistant Examiner*—Jerry Martin Blevins
(74) *Attorney, Agent, or Firm*—Dougherty Clements; Christopher L. Bernard; Tyler S. Brown (57) ABSTRACT

An architecture is proposed for an optical node in a wavelength division multiplexed network. The optical node may be an optical add/drop node. Conventional add/drop nodes utilize a broadcast or blocking architecture. In a broadcast architecture, a copy of an optical signal is dropped to a drop path of a node while another copy continues on a through path. Thus, channels that occupy a specific portion of wavelengths (or spectrum) prior to the node are not available for use subsequent to the add/drop connectivity. In a blocking architecture, at least the through path (and often the drop path) is spectrally filtered. This permits wavelength reuse for add/drops in subsequent portions of the network. Disclosed is an optical node architecture that enables starting with a low cost approach, such as broadcast, but includes connections to permit 'in-service' upgrade to more capable architecture. Increasing spectral reuse is enabled through the architecture.

17 Claims, 9 Drawing Sheets

RECONFIGURABLE OPTICAL NODE WITH DISTRIBUTED SPECTRAL FILTERING

PROVISIONAL APPLICATION

The present application claims priority under 35 U.S.C. § 120 of a provisional application 60/410,996 filed on Sep. 16, 2002, the entirety of which is hereby incorporated by reference.

FIELD OF THE INVENTION

The field of the invention generally relates to optical nodes, for example optical add/drop multiplexers (OADM). More particularly, the invention relates to an upgradeable/reconfigurable optical node architecture and method for upgrading an optical node and for providing distributed spectral filtering.

BACKGROUND OF THE INVENTION

Conventional add/drop nodes utilize one of two architectures—broadcast and blocking architectures. The broadcast architecture is an architecture in which a copy of an optical signal is dropped to a drop path of a node while another copy continues on a through path. Multiple channels are not allowed to occupy same portions of the spectrum inside the transmission medium due to interference. Thus, channels that occupy a specific portion of wavelengths (or spectrum) prior to the node are not available for use subsequent to the add/drop connectivity. However, other unused portions of the spectrum are available for use subsequent to the node. The broadcast architecture may be sufficient in wavelength division multiplexing (WDM) systems with large aggregate channel capacities.

In a blocking architecture, at least the through path (and often the drop path) is spectrally filtered. This permits wavelength reuse for add/drops in subsequent portions of the network. The reuse of wavelengths provides advantages by making additional channels available for connecivity, thereby increasing the total capacity available on the communications network.

Optical networks provide a tremendous capacity advantage. Entities wishing to take advantage of the advantages that optical networks offer, must usually make a decision based on their current needs (which may be modest and predictable) and their future needs (which are typically unpredictable). An entity may decide to acquire a network to meet its short-term needs because of it's present financial constraints.

However, this approach carries a risk that the network will be insufficient and may cost more in the long run because the entire network has to be replaced due to inadequacies of the network. Also, any upgrades may require the network to be shut down prior to the upgrade. Such a shut down is costly since no service can be provided, which in turn shuts down a revenue stream. In an industry such as telecommunications, shut down can be extremely costly indeed.

Another approach is to project a long-term need and acquire a network with capabilities to meet the long-term need. This approach also carries inherent risks as well. In the short run, the investment in the network will be wasted to the extent that there will be excess capacity. In the long run, the needs of the entity may change in a different direction and the acquired network will not be able to handle the changed needs efficiently.

An approach is desired whereby an initial network deployment may be achieved at relatively low cost while allowing for sufficient capacity. As the capacity demand grows, it is desired to provide an easily upgradeable path as well as a strategy for recovering previously inaccessible capacity, all without service disruptions.

BRIEF DESCRIPTION OF THE DRAWINGS

Features of the present invention will become more fully understood to those skilled in the art from the detailed description given hereinbelow with reference to the drawings, which are given by way of illustrations only and thus are not limitative of the invention, wherein.

DETAILED DESCRIPTION

For simplicity and illustrative purposes, the principles of the present invention are described by referring mainly to exemplary embodiments thereof. The same reference numbers and symbols in different drawings identify the same or similar elements. Also, the following detailed description does not limit the invention. The scope of the invention is defined by the claims and equivalents thereof.

The expression "optically communicates" as used herein refers to any connection, coupling, link or the like by which optical signals carried by one optical element are imparted to the "communicating element." Such "optically communicating" devices are not necessarily directly connected to one another and may be separated by intermediate optical components and/or devices. Likewise, the expresssions "connection", "operative connection", and "optically placed" as used herein are relative terms and do not necessarily require a direct physical connection.

In an aspect of the present invention, an optical node architecture is proposed that enables starting out with a low cost approach, such as broadcast. The architecture includes connections to permit 'in-service' upgrade to a more capable spectrally blocking system. In other words, the upgrade may take place without any substantial disruption in service. Such 'in-service' upgrade capability can save significant costs by reducing or eliminating all together any shut down time.

It is to be understood that upgrade is not the only benefits of the architecture. For example, the connection can also allow for in-service maintenance to take place as well.

Figure 1A:
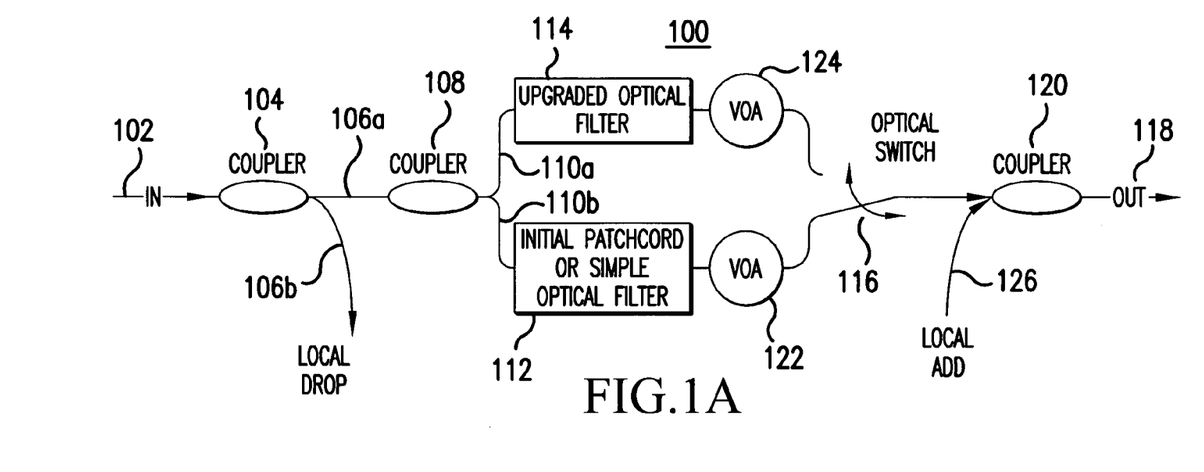
FIGS. 1a–1c are block diagrams illustrating varying embodiments of an optical add/drop node architecture according to the present invention.
Figure 1B:
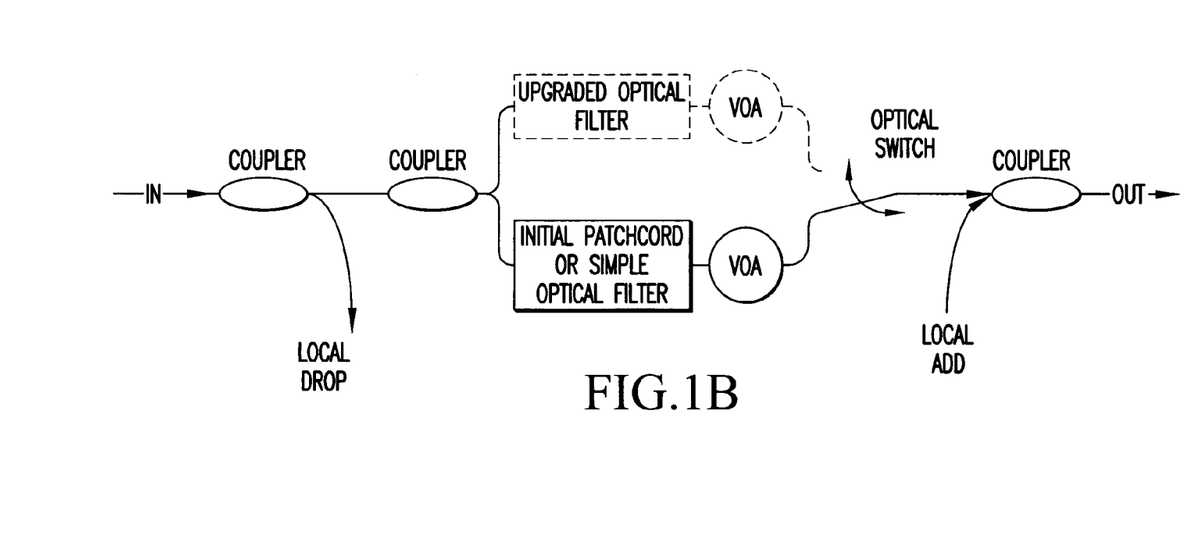

FIGS. 1a and 1b are block diagrams illustrating an embodiment of an optical node architecture according to the present invention. In FIG. 1a, the optical node 100 includes a through path coupler 108 receiving input optical signals from the input port 102. The through path coupler 108 is configured to provide the received input optical signals and provide the same through its outputs. In this instance, the through path coupler 108 is shown as outputting first and second through optical signals to first and second outputs 110a and 110b, respectively. However, it is to be understood that there can be more that two outputs. The through path coupler 108 may not spectrally filter and thus the first and second through optical signals carry the same data.

The optical node 100 also includes a first optical filter 112, which receives the first through optical signal via the first output port 110a. The first optical filter may be a basic initial patch cord which allows for direct optical pass through of the first through optical signal, or it may be a simple optical filter to perform rudimentary filtering.

The optical node 100 further includes a selective connector, which is represented as an optical switch 116 in FIG. 1a. The selective connector 116 is initially optically connected to the first optical filter 112 as shown, and directs optical transmission signals to the output port 118. As the name implies, the selective connector 116 is able to switch connection to direct optical transmission signals from the other optical filters.

As noted above, the through pass coupler 108 provides the second through optical signal to the second output 110b. Initially this path may be left unconnected as shown in FIG. 1b. More specifically, in FIG. 1b, the dotted lines indicate that a second optical filter 114 is not present in the initial version of the optical node 100.

However, it is this availability of the second path that enables an upgrade to take place without disruption in service. To accomplish the upgrade, the second optical filter 114, which may be an upgraded filter relative to the first optical filter 112, may be placed and connected to the second output 110b of the through path coupler 108. When connected, the second optical filter 114 receives and processes the second through optical signal. Recall that the second through optical signal may be identical to the first through optical signal.

Figure 1C:
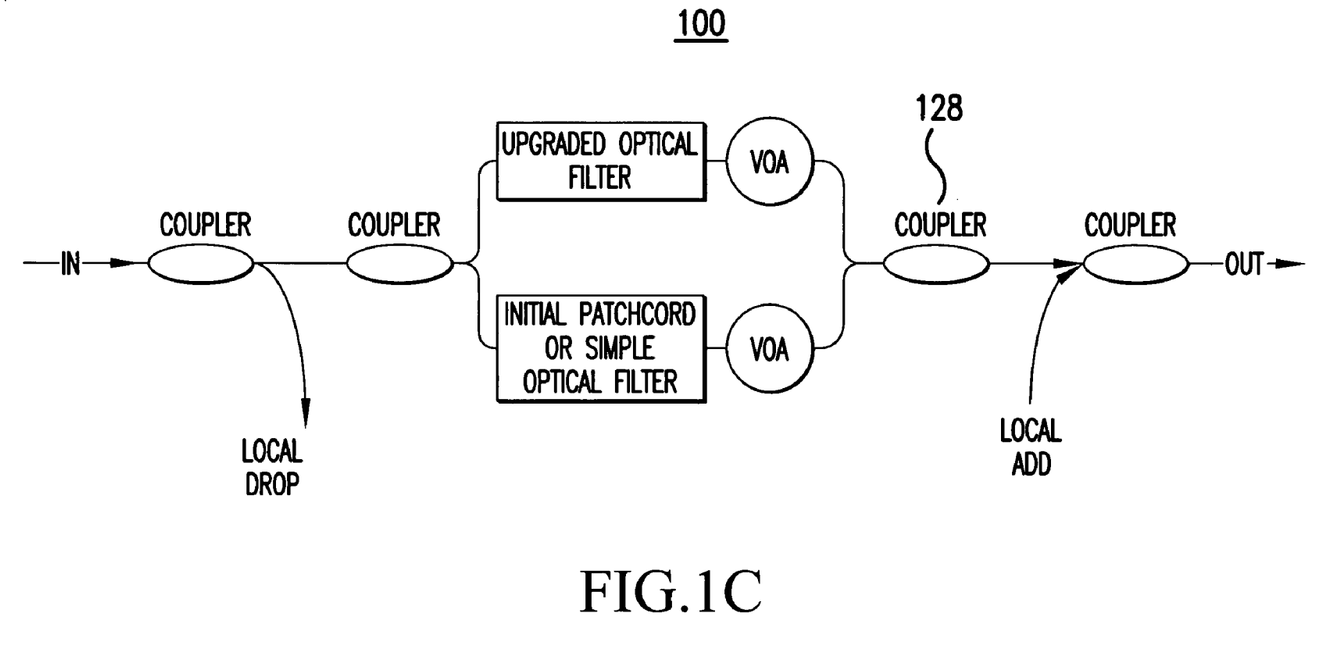

The optical node 100 may include drop and add couplers 104 and 120, respectively, to enable drop/add capability. As shown in FIGS. 1a–1c, the drop coupler 104 is optically connected to the input port 102 and provides the input optical signal to the through path coupler 108 via a through path 106a. The drop coupler 104 may also provide the input optical signal via a drop path 106b. Portions of the input optical signal may be processed through apparatus and/or systems connected to the drop path 106b. Typically, the drop coupler 104 is spectrally unfiltered and thus the same input optical signal is provided on both the through and drop paths 106a and 106b, respectively.

The add coupler 120 receives the optical signal selected by the selective connector 116 and may receive optical transmission from the add path 126 and outputs the received signals as output optical signals to the output port 118.

Optionally, variable optical attenuators (VOAs) may be connected to the optical through paths to equalize optical signal amplitudes such as the amplitudes of the optical signals on the through and the add paths. For example, as shown in FIGS. 1a–1c, a first VOA 122 may be optically placed between the first optical filter 112 and the selective connector 116 and a second VOA may be placed between the second optical filter 114 and the selective connector 116.

The VOAs themselves may serve as a replacement of or as a complementary addition to the optical switch 116. In other words, the VOAs may also be used as the selective connector 116. If VOAs are used for switching purposes, then a combining coupler 128 may be used as shown in FIG. 1c.

A controller (not shown) may be used to control the VOAs. A conventional service channel, overlay IP network, DCC (or other overhead channel), or other communication methods may be used to communicate administrative, maintenance, and control information to enable intelligent control of the selective connector 116—whether it be made of an optical switch, VOAs, or a combination of both.

Typically, optical communications systems transport signals uni-directionally on a fiber. Bi-directionality may be achieved through using a pair of uni-directional systems. In such instances, pairs of optical nodes of the embodiments described in FIGS. 1a–1c may be required. If reliability is to be enhanced, additional nodes may be provided to provide redundancy.

Figure 2:
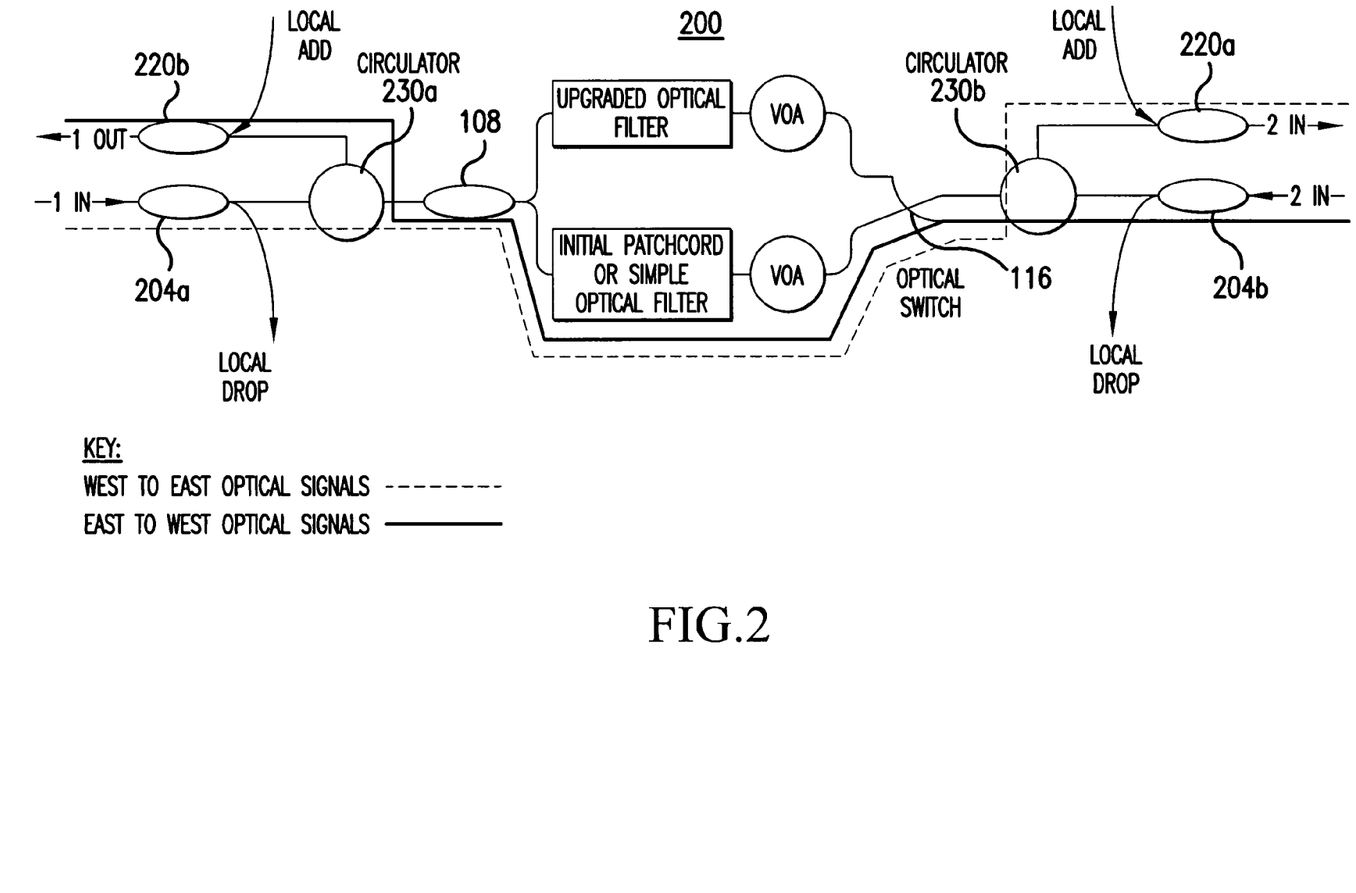
FIG. 2 is a block diagram illustrating a bi-directional variation of an optical add/drop node architecture according to an embodiment of the present invention.

It is also the case that optical components are often reciprocal, i.e., they may be operated bi-directionally with same properties. Further, optical add/drop nodes frequently have identical configuration of optical filters in both directions. FIG. 2 is a block diagram illustrating a bi-directional variation of an optical node architecture according to an embodiment of the present invention.

In the west to east direction (indicated by a dashed line), the optical node 200 of FIG. 2 is much like the optical node 100 of FIGS. 1a–1c. A first drop coupler 204a can be considered to be equivalent to the drop coupler 104 of the optical node 100. Similarly, a first add coupler 220a can be considered to be equivalent to the add coupler 120. The east to west signal transmission is accomplished by the addition of a second drop coupler 204b and a second add coupler 220b. The bi-directionality is enabled by first and second optical circulators 230a and 230b.

Figure 7A:
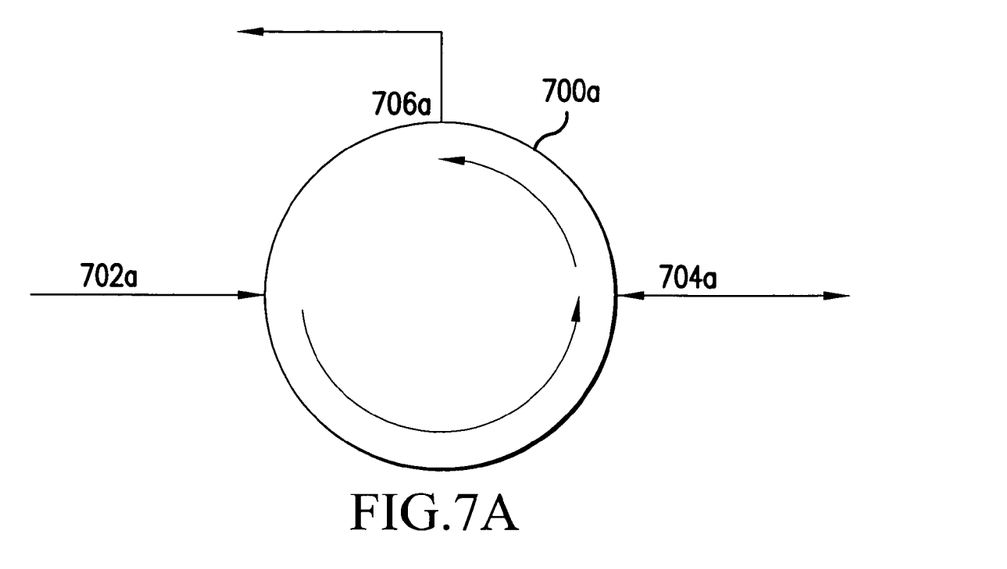
FIGS. 7a–b are block diagrams illustrating embodiments of various types of optical circulators according to the present invention.
Figure 7B:
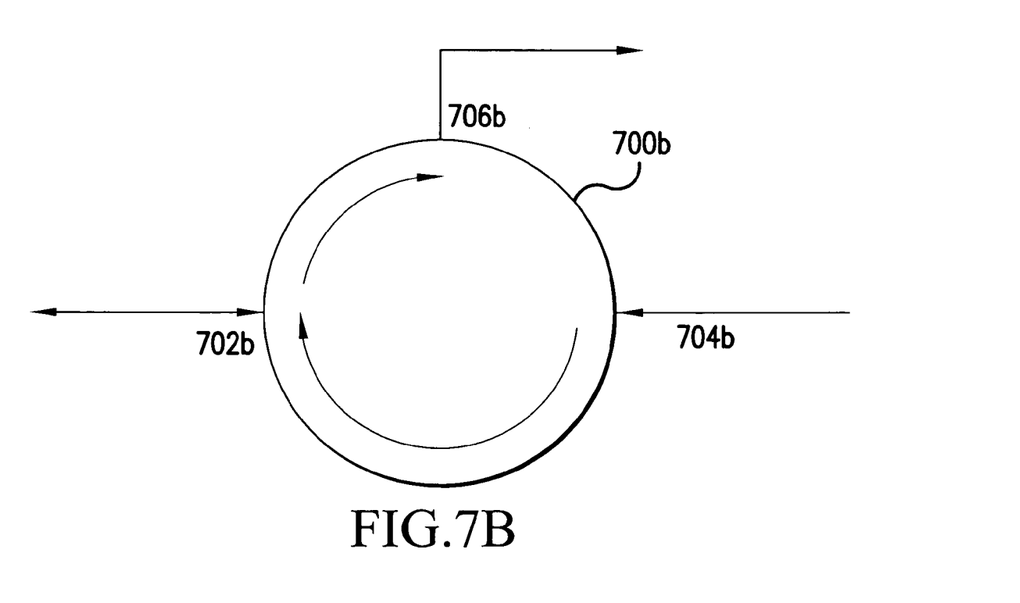

Circulators may be described as non-reciprocal devices that redirect light from port-to-port sequentially in one direction only and are generally known in the art. FIG. 7a illustrates a counter-clockwise circulator 700a and FIG. 7b illustrates a clockwise circulator 700b. With the counter-clockwise circulator 700a, light entering port 702a is directed counter-clockwise to exit the next port in sequence which is port 704a. Likewise, light entering the port 704a is directed to port 706a. The function of the clock-wise circulator 700b is similar except that the direction is clock-wise as indicated.

As noted above, with reference to FIG. 2, the bi-directionality of the optical node 200 may be achieved through the use of the circulators 230a and 230b. For example, the circulator 230a may be a counter-clockwise circulator and the circulator 230b may be a clockwise circulator. In other words, the first circulator 230a may direct optical signal traffic from the first drop coupler 204a to the through path coupler 108 and direct optical signal traffic from the through path coupler 108 to the second add coupler 220b. The second circulator 230b may direct optical signal traffic from the selective connector 116 to the first add coupler 220a and direct optical signal traffic from the second drop coupler 204b to said selective connector 116.

Figure 3:
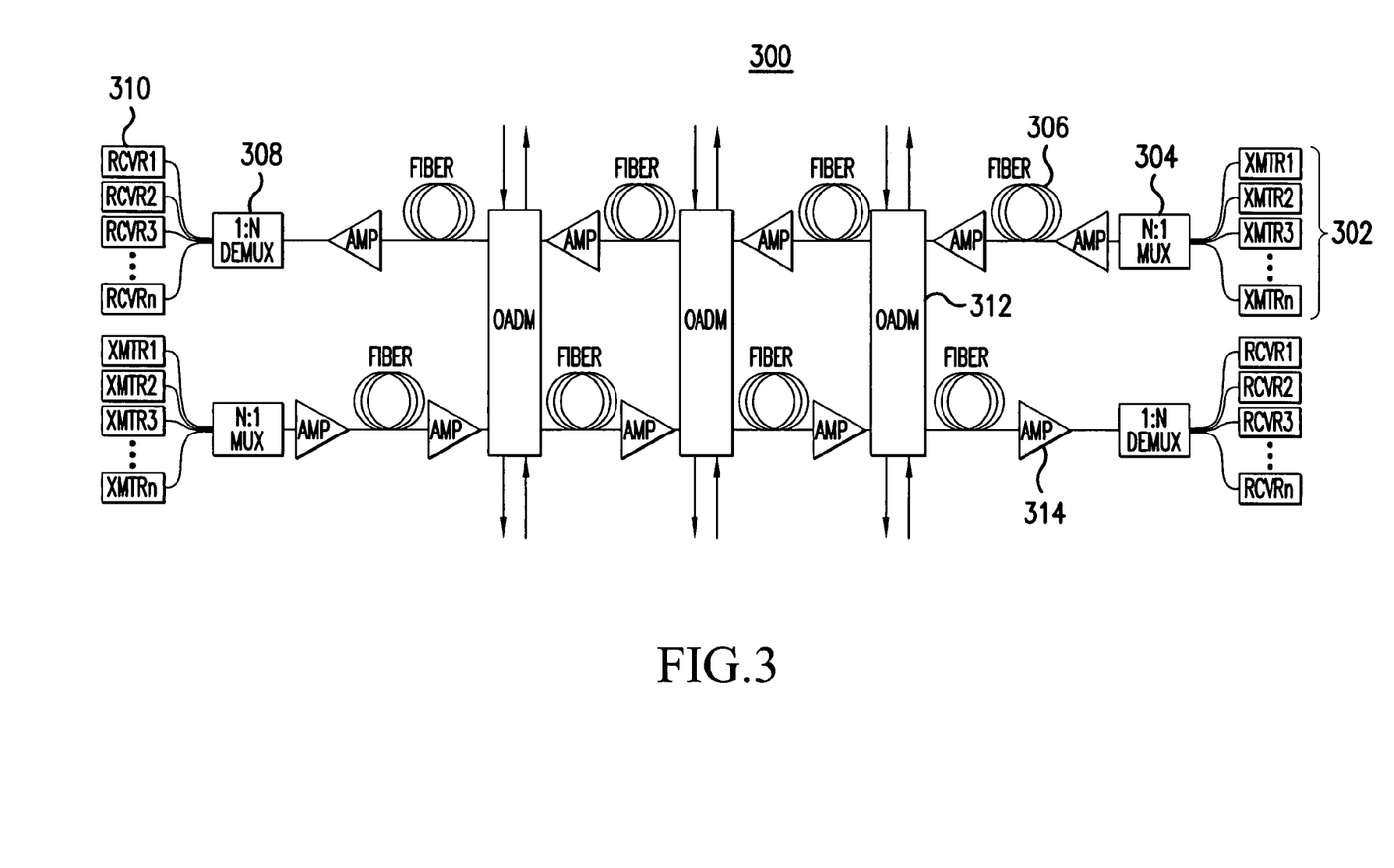
FIG. 3 is a block diagram illustrating a wavelength division multiplexed optical communication system including optical add/drop nodes.

FIG. 3 is a block diagram illustrating a WDM optical communication incorporating several optical nodes 312 (denoted as OADMs) into a fiber optic transmission system.

Figure 4:
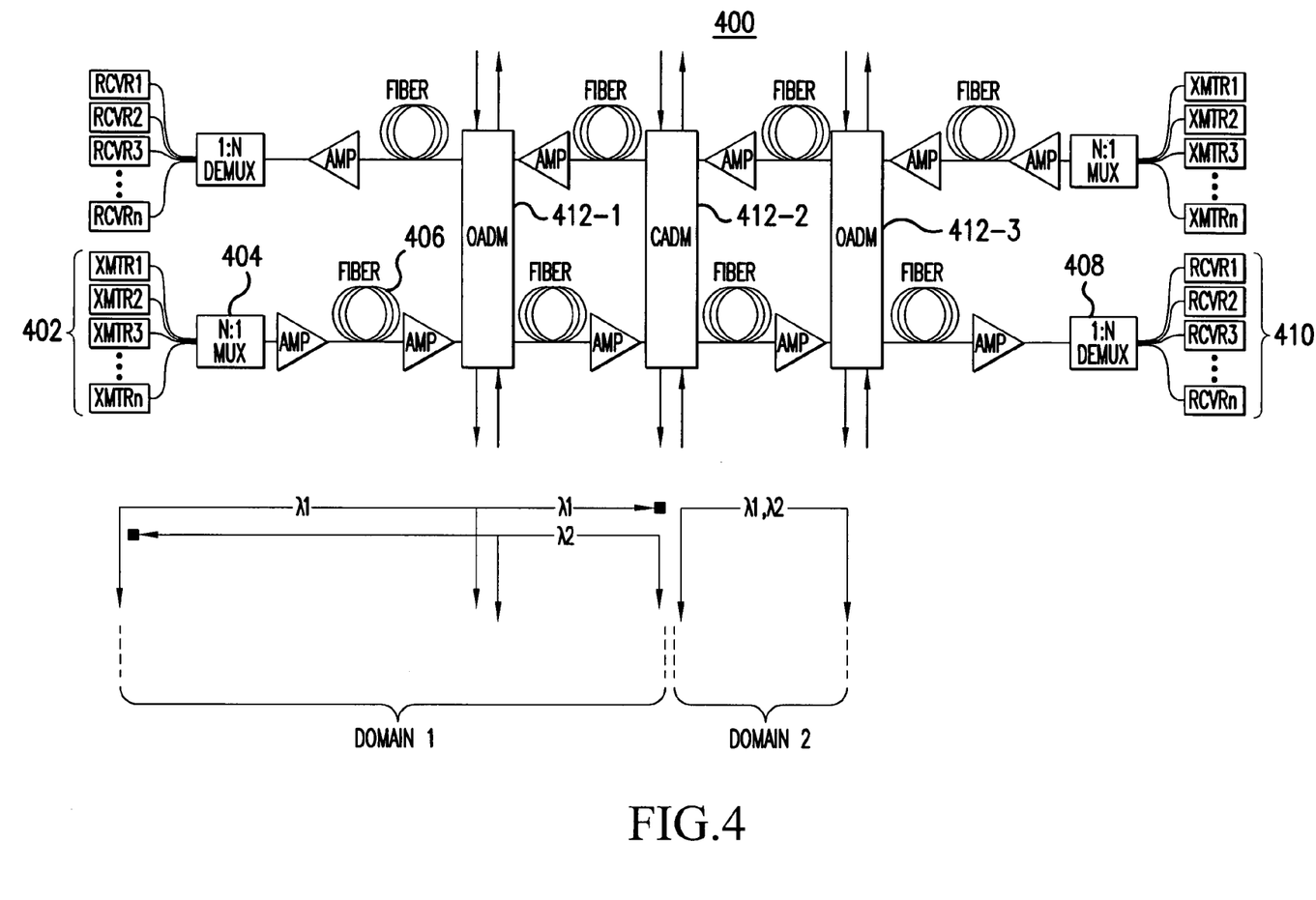
FIG. 4 is a block diagram illustrating a wavelength division multiplexed optical communication system including optical add/drop nodes further illustrating wavelength domains and spectral reuse concept according to an embodiment of the present invention.

FIG. 4 is a block diagram illustrating a wavelength division multiplexed optical communication system including OADM nodes further illustrating wavelength domains and spectral reuse concept according to an embodiment of the present invention. While the system 400 is bi-directional, for illustration purposes, it suffices to describe the lower portion of the system showing transmission of signals in a left to right direction.

As shown, the optical communication system 400 includes a plurality of transmitters 402 transmitting input signals, a multiplexer 404 multiplexing the signals from the plurality of transmitters 402 to a fiber optic line 406, a demultiplexer 408 demultiplexing signals from the fiber optic line 406, and a plurality of receivers 410 receiving the demultiplexed signals from the demultiplexer 408.

Between the multiplexer 404 and the demultiplexer 408, one or more optical nodes 412 may be optically placed. In this instance, three optical nodes 412-1, 412-2, and 412-3 are illustrated. However, it is to be understood that the embodiment is not limited to only three optical nodes 412. The optical nodes 412 may be spectrally unfiltered OADMs that prohibits subsequent spectral reuse.

Figure 6A:
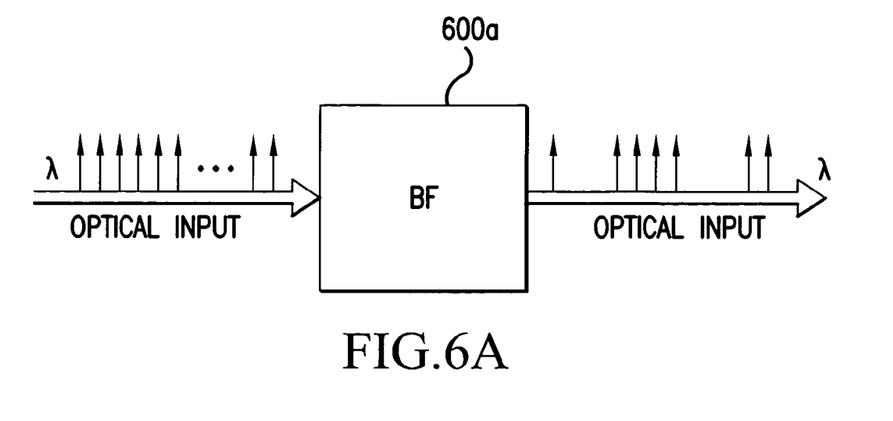
FIGS. 6a–c are block diagrams illustrating embodiments of various types of spectral blocking filter according to the present invention.
Figure 6B:
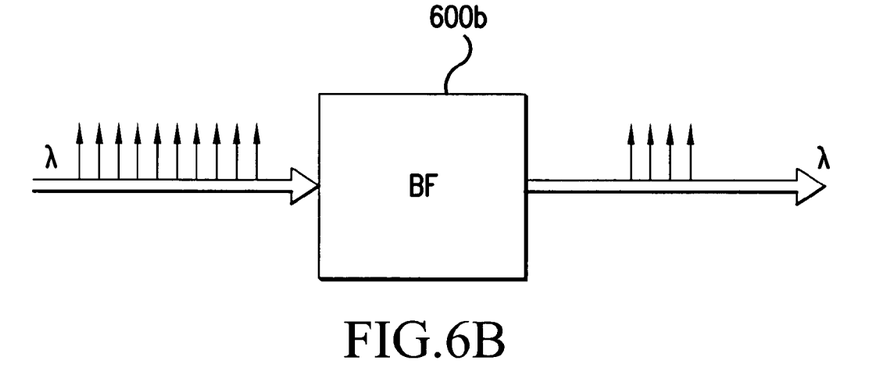
Figure 6C:
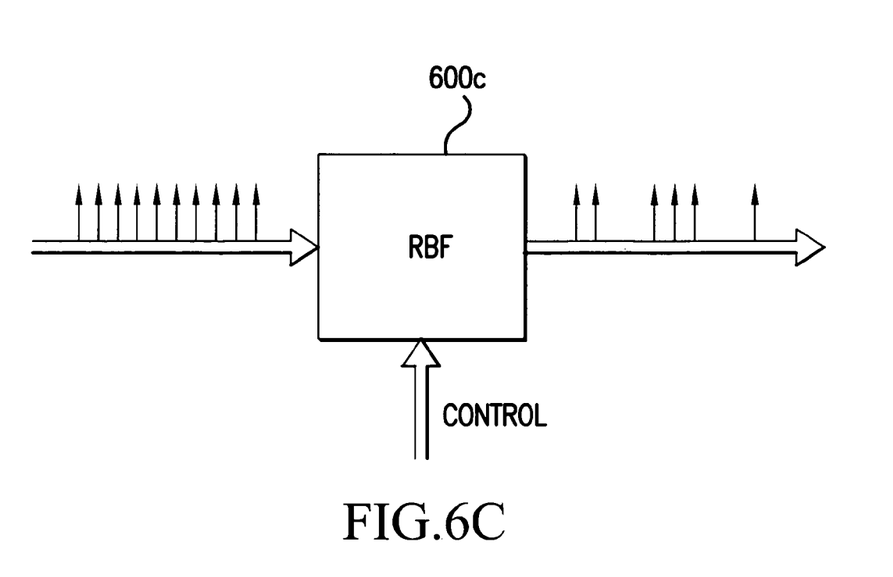

However, other OADMs may include spectral filters 600a, 600b, and 600c such as illustrated in FIGS. 6a–6c. FIG. 6a illustrates a generalized blocking filter (BF) 600a which receives as optical input a spectrum of wavelengths represented by the symbol $\lambda$. The BF 600a blocks a subset of the spectrum and outputs the remainder (or complementary set) of the wavelengths of the spectrum. Whereas the BF 600a blocks an arbitrary portions of the spectrum, FIG. 6b illustrates a BF 600b which only allows a contiguous portion of the spectrum to pass through. The BF 600b may be viewed as a particular case of the general BF 600a. FIG. 6c illustrates a reconfigurable blocking filter (RBF) 600c wherein the particular wavelengths blocked may be chosen through control signals. A description of a particular type of RBF may be found in a provisional application 6,492,114, filed Aug. 4, 2003 by the common Assignee of the present application and is hereby incorporated by reference in its entirety.

A blocking OADM 412 may block not only the channels that are dropped at the node itself, but may also block channels that have been broadcast from precedings nodes that lack a blocking filter. This allows significant portions of the spectrum to be recovered for reuse.

An example of spectrum reuse, according to an embodiment of the present invention, is described with reference to FIG. 4. In this instance, it is assumed that all optical nodes 412 are OADMs. As shown, in domain 1 (between the plurality of receivers 410 and the optical node 412-2) supports wavelength $\lambda 1$. It is assumed that the OADM 412-1 is unfiltered. As such, the wavelength $\lambda 1$ from a first leg of domain 1 (between the plurality of transmitters 402 and OADM 412-1) is transmitted through the OADM 412-1 into a second leg (between OADMs 412-1 and 412-1). As a result, connectivity on the second leg cannot use $\lambda 1$ and chooses $\lambda 2$ instead. However, it is assumed that OADM 412-2 is spectrally blocks both wavelengths $\lambda 1$ and chooses $\lambda 2$ permitting reuse of both wavelengths in domain 2.

The presence of blocking filters at selected OADM sites permit a network to be segmented into "broadcast" domains.

Figure 5:
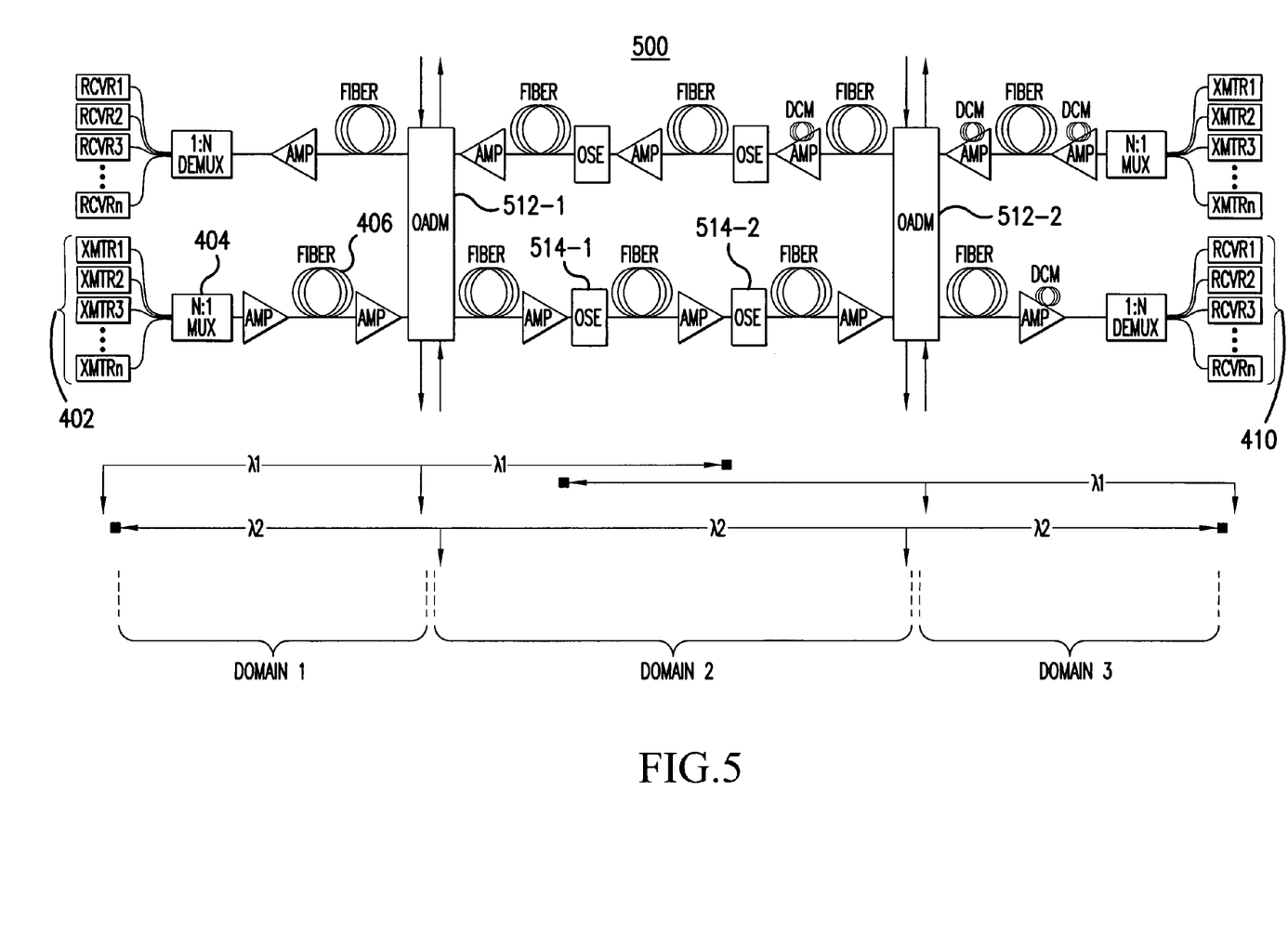
FIG. 5 is a block diagram illustrating a wavelength division multiplexed optical communication system including optical add/drop nodes and optical spectral equalizers further illustrating wavelength domains and spectral reuse concept according to an embodiment of the present invention.

It is to be noted that use of blocking OADMs is not the only way to achieve spectral reuse. FIG. 5 is a block diagram illustrating a wavelength division multiplexed optical communication system including optical add/drop nodes and optical spectral equalizers further illustrating wavelength domains and spectral reuse concept according to an embodiment of the present invention. Again, only the lower portion will be described.

As shown, the optical communication system 500 includes the plurality of transmitters 402 transmitting input signals, the multiplexer 404 multiplexing the signals from the plurality of transmitters 402 to the fiber optic line 406, the demultiplexer 408 demultiplexing signals from the fiber optic line 406, and the plurality of receivers 410 receiving the demultiplexed signals from the demultiplexer 408.

Between the multiplexer 404 and the demultiplexer 408, one or more optical nodes 512 may be optically placed. While only two optical nodes 512-1 and 512-2 are shown, it is understood that the number is not so limited.

The system 500 may also include optical spectrum equalizers (OSE) 514 optically placed between the optical nodes 512-1 and 512-2. Again, while only two OSEs 514-1 and 514-2 are shown, the number of OSEs is not so limited and may be as few as one depending on signal attenuation capacities, as explained herein below.

In this instance, both optical nodes 512-1 and 512-2 are assumed to be spectrally unfiltered OADMs. This would normally prohibit spectral reuse. OSEs are typically used to reshape channel powers to achieve power flatness across the channels.

Another use for OSEs is to reduce noise in the unused regions of the spectrum. A noise suppression of more than 20 dB in selected spectrum regions can provide enough isolation to allow spectral reuse. It may be that a single OSE may not be capable of providing sufficient suppression. Typical OSE module may provide a dynamic range for noise suppression of ~10 to 20 dB, which is generally not sufficient. However, cascading multiple OSE modules after the node where the original spectrum is dropped may provide sufficient isolation in selected spectrum regions. The embodiment as illustrated in FIG. 5 is based on this concept.

As shown, wavelength $\lambda 1$ is supported in domain 1 (between the plurality of transmitters 402 and OADM 512-1). The same wavelength $\lambda 1$ is transmitted through the OADM 512-1 but the OSEs 514-1 and 514-2 progressively attenuate the wavelength $\lambda 1$. After passing through the OSEs 514-1 and 514-2, the wavelength $\lambda 1$ is sufficiently attentenuated to allow its reuse in domain 3. The connectivity in domain 2 (center segment) is assumed to be established with wavelength $\lambda 2$ and this wavelength may not be reused in domains 1 and 3. Again, the number of OSE is not limited to two, but it should be enough sufficiently attenuate the chosen wavelength(s) to allow them to be reused in subsequent segments of the system 500.

The embodiments shown in FIGS. 4 and 5 may be viewed as distributed spectral filtering systems In the case of FIG. 4, filtering is provided by elements, namely the OADMs 412, dedicated to channel suppression. In case of FIG. 5, filtering is provided in a more distributed sense by elements, namely the OSEs 514, whose primary task is to flatten the power spectrum and reduce noise accumulation. In this sense, the "broadcast" channels are viewed as noises to be gradually removed from appropriate segments of the network.

Figure 8:
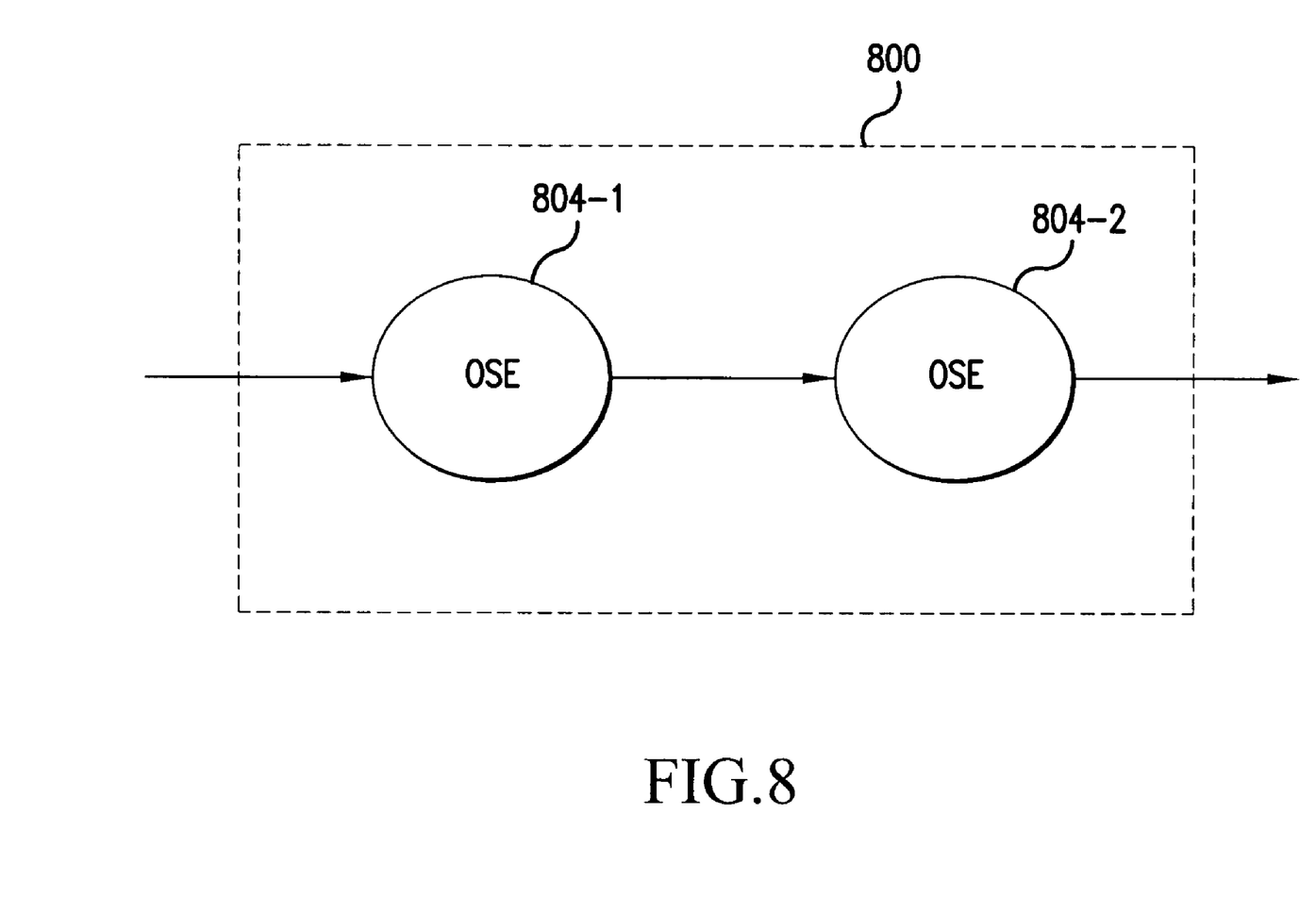
FIG. 8 is a block diagram illustrating a particular blocking filter according to an embodiment of the present invention.

As indicated above, a single OSE is typically not sufficient for spectral reuse, but reuse can be enabled by cascading of multiple OSEs. Thus in an embodiment of the present invention, a blocking filter such filters 600*a*, 600*b*, and 600*c* may be a combination of a series of two or more OSEs. For example, as shown in FIG. 8, the optical filter 800 may include OSEs 804-1 and 804-2. The filtering is provided by the OSEs 804-1 and 804-2. Note that the optical filter 800 may be utilized as either the first or second optical filter 112, 114.

It is noted that in most long-haul systems, OSEs are already included for other reasons. In this instance, the optical filter 800 having only one OSE 804-1 may be sufficient.

With the various embodiments of the present invention, a dynamically upgradeable optical network architecture is provided. Initially, the network may start with low cost approach but include connections to permit in-service upgrades to more capable architecture.

While the invention has been described with reference to the exemplary embodiments thereof, it is to be understood that various modifications may be made to the described embodiments without departing from the spirit and scope of the invention thereof. The terms as descriptions used herein are set forth by way of illustration only and are not intended as limitations.

What is claimed is:

1. An optical node apparatus, comprising:
    a through path coupler having at least first and second outputs, the through path coupler configured to optically connect to an input port for receiving an input optical signal and configured to provide a first through optical signal on the first output and a second through optical signal on the second output;
    a first optical filter for optically connecting to the first output port and configured to filter the first through optical signal; and
    a selective connector configured for enabling selective optical connection to an output of the first optical filter;
    wherein the second output port is initially left unconnected and is configured to accept a second optical filter and the selective connector is configured to switch optical connection to an output of the second optical filter without any substantial disruption to an operation of the optical node apparatus;
    wherein the optical node apparatus is reconfigurable while in-service and comprises connections to permit an in-service upgrade from a broadcast architecture to a spectrally blocking architecture, permitting spectral wavelength reuse in subsequent portions of a network;
    wherein the optical node apparatus comprises connections to permit in-service maintenance; and
    wherein the in-service upgrade and the in-service maintenance are made without requiring that the optical node be shut down and without service disruptions.

2. The optical node apparatus of claim 1, wherein the second optical filter is an upgraded filter relative to the first optical filter.

3. The optical node apparatus of claim 1, further comprising: a drop coupler optically connected to the input port and outputting the input optical signal to the through path coupler via a through path and also outputting the input optical signal to a drop path; and an add coupler optically connected to receive the output of the first or second optical filter selected by said selective connector and optically connected to an add path for outputting an output optical signal to an output port.

4. The optical node apparatus of claim 3, wherein the selective connector is an optical switch.

5. The optical node apparatus of claim 3, further comprising: a first variable optical attenuator optically placed between the first optical filter and the selective connector; and a second variable optical attenuator optically placed between said second optical filter and said selective connector.

6. The optical node apparatus of claim 5, wherein the selective connector is an optical switch.

7. The optical node apparatus of claim 5, wherein the first and second variable optical attenuators are configured to be operated in a manner such that only one of the attenuators is disabled from attenuating at any given moment.

8. The optical node apparatus of claim 7, further comprising a combining coupler optically connected to the first and second variable optical attenuators as inputs and optically connected to the add coupler.

9. The optical node apparatus of claim 3, wherein at least one of the first and second optical filters is a spectral blocking filter configured to permit a subset of a spectrum of the input optical signal to pass through while blocking a complementary subset of the spectrum of the input optical signal.

10. The optical node apparatus of claim 9, wherein the subset is a contiguous portion of the spectrum.

11. The optical node apparatus of claim 9, wherein the spectral blocking filter is a reconfigurable blocking filter.

12. The optical node apparatus of claim 3, wherein the drop coupler is a first drop coupler and the add coupler is a first add coupler, the optical node apparatus further comprising: a first circulator optically placed between the first drop coupler and the through path coupler; a second circulator optically placed between the first add coupler and the selective connector; a second drop coupler optically connected to the second circulator; and a second add coupler optically connected to the first circulator, wherein the first circulator is configured to direct optical signal traffic from the first drop coupler to the through path coupler and to direct optical signal traffic from the through path coupler to the second add coupler and the second circulator is configured to direct optical signal traffic from the selective connector to the first add coupler and to direct optical signal traffic from the second drop coupler to the selective connector.

13. A fiber optic transmission system, comprising:
    a plurality of transmitters configured to transmit input signals;
    a multiplexer optically connected to a fiber optic line, said multiplexer configured to multiplex signals from the plurality of transmitters to the fiber optic line;
    a demultiplexer optically connected to the fiber optic line, the demultiplexer configured to demultiplex optical signals from the fiber optic line;
    a plurality of receivers configured to receive the demultiplexed signals from the demultiplexer; and
    one or more optical add/drop nodes of claim 3 optically placed between the multiplexer and the demultiplexer;
    wherein an optical node apparatus within the fiber optic transmission system is reconfigurable while in-service and comprises connections to permit an in-service upgrade from a broadcast architecture to a spectrally blocking architecture, permitting spectral wavelength reuse in subsequent portions of a network;
    wherein an optical node apparatus within the fiber optic transmission system comprises connections to permit in-service maintenance;and wherein the in-service upgrade and the in-service maintenance are made without requiring that the optical node be shut down and without service disruptions.

14. The fiber optic transmission system of claim 13, wherein at least one of the optical add/drop nodes includes a spectral blocking filter configured to permit a subset of a spectrum of the input optical signal to pass through while blocking a complementary subset of the spectrum of the input optical signal.

15. The fiber optic transmission system of claim 14, wherein the subset is a contiguous portion of the spectrum.

16. The fiber optic transmission system of claim 14, wherein the spectral blocking filter is a reconfigurable blocking filter.

17. The fiber optic transmission system of claim 13, further comprising a plurality of optical spectrum equalizers optically placed between any two optical add/drop nodes to sufficiently attenuate one or more chosen wavelengths to allow the chosen wavelengths to be reused in subsequent segments of said fiber optic transmission system.

* * * * *